(12) United States Patent
Elms et al.

(10) Patent No.: US 9,030,795 B2
(45) Date of Patent: May 12, 2015

(54) APPARATUS AND METHOD OF ADAPTIVE ELECTRONIC OVERLOAD PROTECTION

(71) Applicant: Eaton Corporation, Cleveland, OH (US)

(72) Inventors: Robert T. Elms, Monroeville, PA (US); Sandy O. Jimenez, Monaca, PA (US); Engelbert Hetzmannseder, Vienna (AT)

(73) Assignee: Eaton Corporation, Cleveland, OH (US)

( * ) Notice: Subject to any disclaimer, the term of this patent is extended or adjusted under 35 U.S.C. 154(b) by 132 days.

(21) Appl. No.: 13/724,967

(22) Filed: Dec. 21, 2012

(65) Prior Publication Data

US 2014/0177118 A1 Jun. 26, 2014

(51) Int. Cl.
*H02H 5/04* (2006.01)
(52) U.S. Cl.
CPC .................................. *H02H 5/047* (2013.01)

(58) Field of Classification Search
CPC ..................................................... H01H 71/162
USPC ........................................................ 361/93.8
See application file for complete search history.

(56) References Cited

U.S. PATENT DOCUMENTS

| | | |
|---|---|---|
| 5,260,676 A | 11/1993 | Patel et al. |
| 5,293,522 A | 3/1994 | Fello et al. |
| 5,418,677 A | 5/1995 | Engel |
| 5,596,467 A * | 1/1997 | Yamamoto ..................... 361/38 |
| 7,675,721 B2 | 3/2010 | Elms |
| 8,599,523 B1 * | 12/2013 | Ostrovsky et al. .............. 361/45 |

* cited by examiner

*Primary Examiner* — Thienvu Tran
*Assistant Examiner* — Tien Mai
(74) *Attorney, Agent, or Firm* — Eckert Seamans Cherin & Mellott, LLC; Nathaniel C. Wilks; Kirk D. Houser

(57) ABSTRACT

A method provides electronic overload protection having a thermal trip level. The method executes a function by a processor; provides the electronic overload protection by the function executed by the processor; and adjusts the thermal trip level by the function executed by the processor in order to mimic adjusting a physical thermal characteristic of a thermal time constant of a fixed mechanical system.

14 Claims, 4 Drawing Sheets

APPARATUS AND METHOD OF ADAPTIVE ELECTRONIC OVERLOAD PROTECTION

BACKGROUND

1. Field

The disclosed concept pertains generally to circuit interrupters and, more particularly, to circuit breakers including an electronic trip mechanism. The disclosed concept also pertains to methods of providing electronic overload protection.

2. Background Information

Circuit interrupters include, for example, circuit breakers, contactors, motor starters, motor controllers, other load controllers and receptacles having a trip mechanism. Circuit breakers are generally old and well known in the art. Examples of circuit breakers are disclosed in U.S. Pat. Nos. 5,260,676; and 5,293,522.

Circuit breakers are used to protect electrical circuitry from damage due to an overcurrent condition, such as an overload condition or a relatively high level short circuit or fault condition. In small circuit breakers, commonly referred to as miniature circuit breakers, used for residential and light commercial applications, such protection is typically provided by a thermal-magnetic trip device. This trip device includes a bimetal which is heated and bends in response to a persistent overcurrent condition. The bimetal, in turn, unlatches a spring powered operating mechanism which opens the separable contacts of the circuit breaker to interrupt current flow in the protected power system. An armature, which is attracted by the sizable magnetic forces generated by a short circuit or fault, also unlatches, or trips, the operating mechanism.

Miniature circuit breakers use bimetals or analog circuits to provide overload (thermal) protection. Known mechanical trip systems physically move bimetals in order that tripping occurs at a fixed bimetal temperature. Bimetals do a good job of simulating thermal cooling of power conductors. The bimetal trips a circuit breaker when its temperature reaches a certain predetermined value. Most of today's circuit breakers are not ambient temperature compensated.

UL 489 is a molded case circuit breaker standard that controls tripping characteristics. For a circuit breaker rated at, for example, 30 A or less, the following performance in Table I (defining a set of thermal overload conditions for a circuit breaker (molded case circuit breaker standard) section 7.1.2 "Calibration Tests") is required at different current levels relative to the rated current:

TABLE 1

| Ishunt | Time (t) at Ishunt value | Trip? |
| --- | --- | --- |
| =250% | 10 seconds < t < 180 seconds | yes |
| =250% | t < 10 seconds | no |
| =200% | 12 seconds < t < 120 seconds | yes |
| =200% | t < 12 seconds | no |
| =135% | t < 60 minutes | yes |
| <=110% | must not trip | no |

The two 250% thermal overload conditions of Table 1 are for a post short circuit event of a circuit breaker.

Analog circuits can simulate cooling using charge stored on a capacitor, which is simply reset to a fixed thermal level after a trip. See, for example, U.S. Pat. No. 5,418,677.

Some analog circuits may use the temperature of an internal shunt for tripping, but this technique suffers from ambient temperature calibration issues or inaccuracies at the, above, 135% must trip setting of UL 489.

U.S. Pat. No. 7,675,721 discloses a processor including a thermal overload predictive function, a shunt wire structured to measure current flowing through separable contacts for the thermal overload predictive function, and a temperature sensor structured to measure the temperature of the shunt wire. The thermal overload predictive function receives the measured current and the measured temperature of the shunt wire, and the processor, responsive to the thermal overload predictive function, causes an operating mechanism to trip open the separable contacts in response to the measured current and the measured temperature of the shunt wire. The shunt wire has a wire gauge about the same as the wire gauge of a corresponding power circuit wire. The processor responds to the thermal overload predictive function to cause the operating mechanism to trip open the separable contacts when the thermal overload predictive function determines that the measured current is greater than a first predetermined value, and the measured temperature of the shunt wire is greater than a second predetermined value.

The physical properties of thermal mass and thermal resistance determine trip-time characteristics.

Prior known electronic-mechanical systems sense the temperature of a fixed impedance conductor and trip at a fixed temperature with the time delay determined by the conductor's thermal mass.

There is room for improvement in circuit interrupters, such as circuit breakers, providing electronic overload protection.

There is also room for improvement in methods of providing electronic overload protection.

SUMMARY

These needs and others are met by embodiments of the disclosed concept, which adjust a thermal trip level by a function executed by a processor in order to mimic adjusting a physical thermal characteristic of a thermal time constant of a fixed mechanical system. The function may be a thermal overload predictive function.

In accordance with one aspect of the disclosed concept, a method of providing electronic overload protection having a thermal trip level comprises: executing a function by a processor; providing the electronic overload protection by the function executed by the processor; and adjusting the thermal trip level by the function executed by the processor in order to mimic adjusting a physical thermal characteristic of a thermal time constant of a fixed mechanical system.

As another aspect of the disclosed concept, a circuit interrupter comprises: separable contacts structured to be electrically connected in series with a power circuit conductor having a conductor gauge; an operating mechanism structured to open and close the separable contacts; a processor comprising a thermal overload predictive function; a shunt conductor in series with the separable contacts and being structured to measure current flowing through the separable contacts for the thermal overload predictive function, the shunt conductor having about the same conductor gauge as the conductor gauge of the power circuit conductor; and a temperature sensor structured to measure the temperature of the shunt conductor, wherein the thermal overload predictive function receives the measured current and the measured temperature of the shunt conductor, wherein the processor responsive to the thermal overload predictive function is structured to cause the operating mechanism to trip open the separable contacts in response to the measured current and the measured temperature of the shunt conductor when the thermal overload predictive function determines that the measured current is greater than a first predetermined value, and the measured temperature of the shunt conductor is greater than a second value, and wherein the thermal overload predictive function is further structured to adjust the second value in order to mimic adjusting a physical thermal characteristic of a thermal time constant of a fixed mechanical system.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the term "processor" shall mean a programmable analog and/or digital device that can store, retrieve, and process data; a computer; a workstation; a personal computer; a microprocessor; a microcontroller; a microcomputer; a central processing unit; a mainframe computer; a mini-computer; a server; a networked processor; or any suitable processing device or apparatus.

As employed herein, the term "electrical conductor" shall mean a wire (e.g., solid; stranded; insulated; non-insulated), a copper conductor, an aluminum conductor, a suitable metal conductor, or other suitable material or object that permits an electric current to flow easily.

As employed herein, the statement that two or more parts are "connected" or "coupled" together shall mean that the parts are joined together either directly or joined through one or more intermediate parts. Further, as employed herein, the statement that two or more parts are "attached" shall mean that the parts are joined together directly.

The disclosed concept is described in association with a miniature circuit breaker, although the disclosed concept is applicable to a wide range of circuit interrupters.

Figure 1:
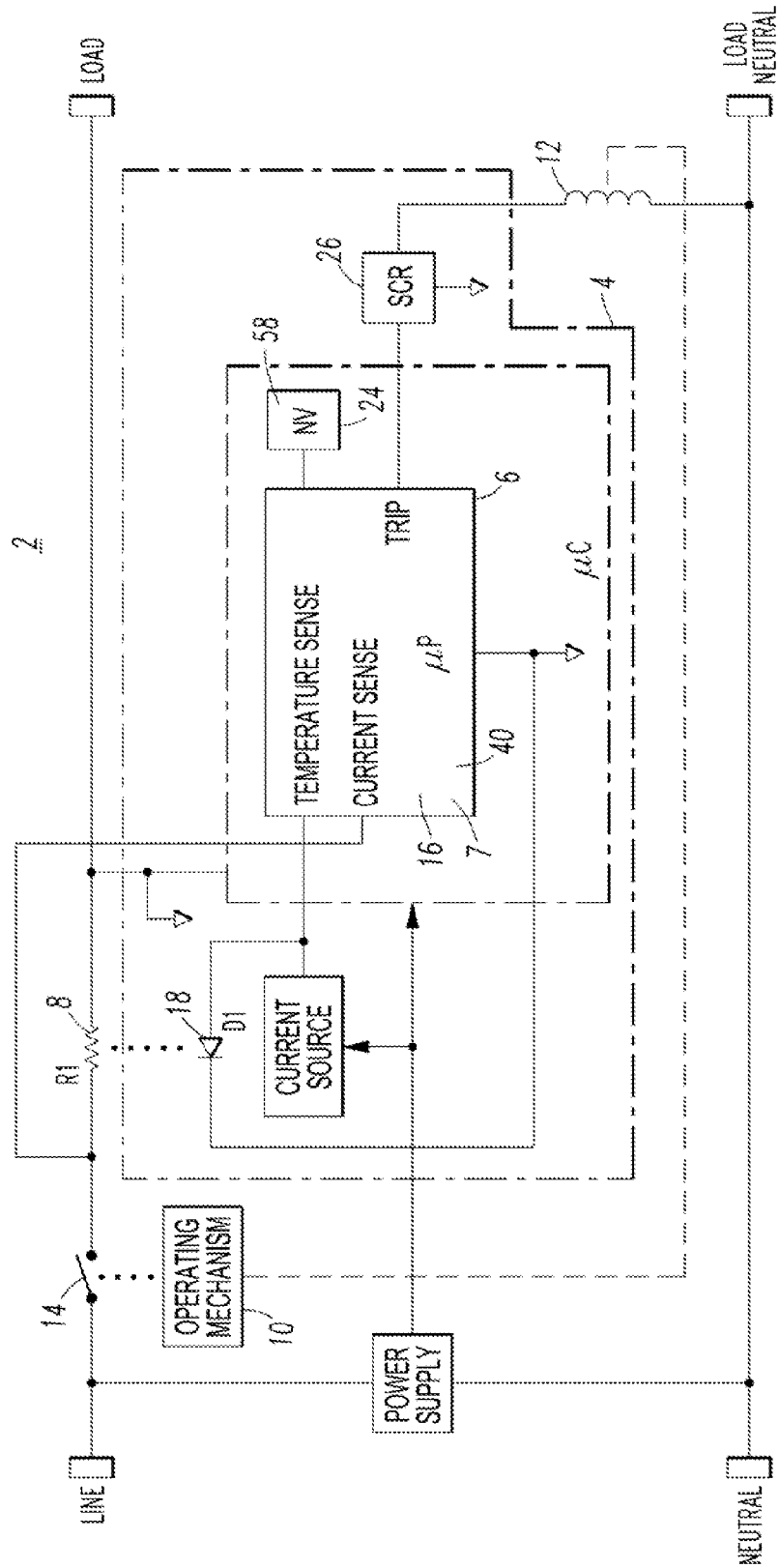
FIG. 1 is a block diagram in schematic form of a circuit breaker in accordance with embodiments of the disclosed concept.

FIG. 1 shows a circuit interrupter, such as a miniature circuit breaker 2, including a protective electronic circuit 4 having a processor, such as microprocessor (μP) 6. For example, for an arc fault circuit interrupter (AFCI) function 7, the protective electronic circuit 4 senses current (e.g., Ishunt=Vshunt/Rshunt) by measuring the voltage (Vshunt) across a shunt wire (R1) 8 having a known resistance (Rshunt), looks for arcing current signatures, and trips a circuit breaker operating mechanism 10 using a trip solenoid 12 to unlatch separable contacts 14. As another example, an electronic ground fault protection function 16 may also be included if a ground fault (GF) sensing current transformer (CT) (not shown) is added with appropriate analog signal amplification (not shown) for input by the μP 6.

Figure 2:
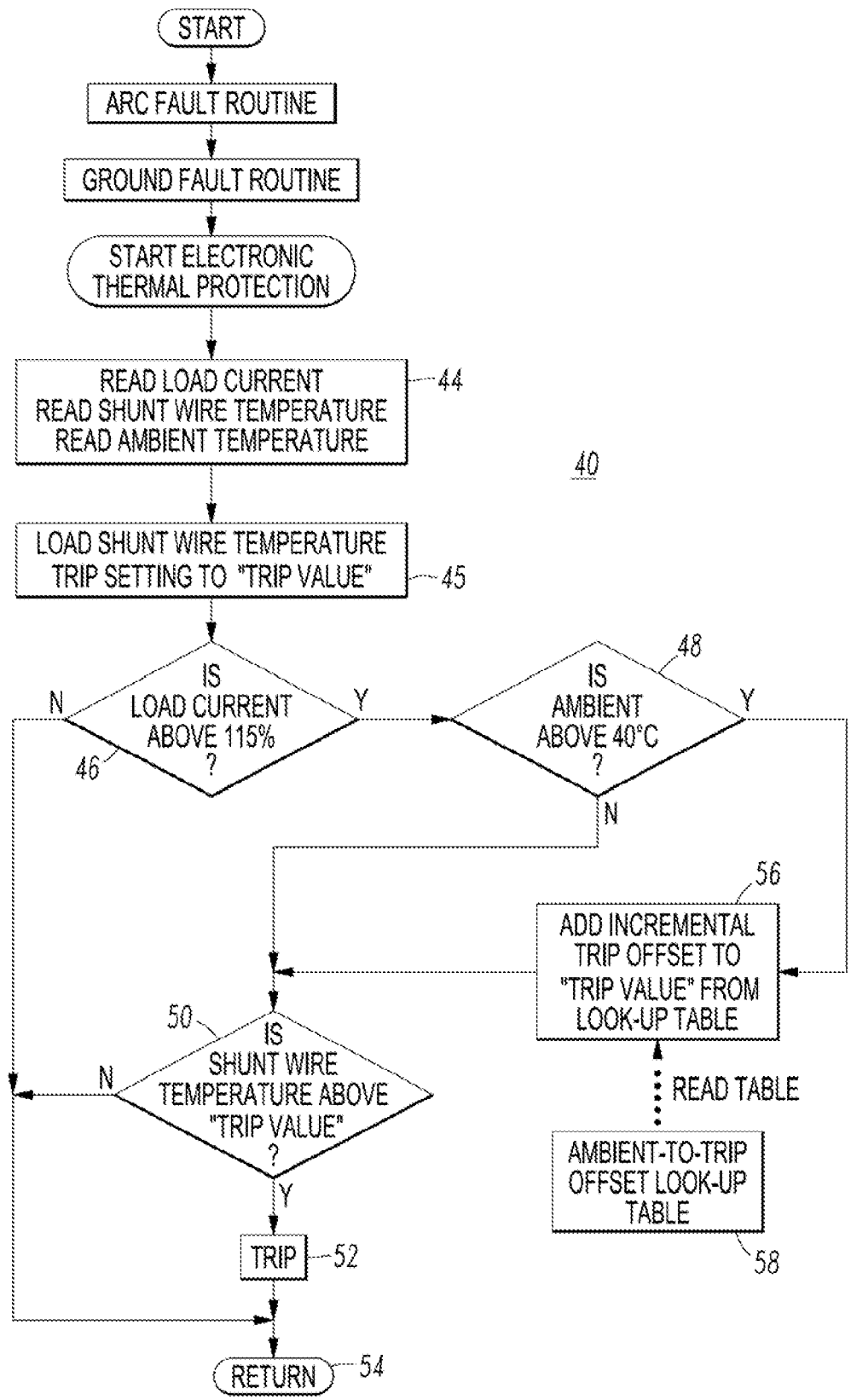
FIG. 2 is a flowchart of a trip routine for the microcomputer of FIG. 1.

A trip routine 40 of the μP 6 is shown in FIG. 2 and provides a thermal overload predictive function. At 44, the load current (current sense), the shunt conductor (e.g., a shunt wire) temperature (temperature sense), and the ambient temperature are read. The load current is determined from the voltage of the shunt wire (R1) 8. The shunt wire temperature is determined from the forward voltage of the example shunt diode (D1) 18. The ambient temperature may be determined from a suitable ambient temperature sensor (not shown) or, optionally, is ignored. In the latter case, steps 48 and 56 are not employed.

Next, at 45, the value "Trip Value" is set from a shunt wire temperature trip setting, as will be discussed, below. Then, at 46, it is determined if the load current is above 115% of rated current. Here, the voltage of the shunt wire (R1) 8 divided by its known resistance is compared to 115% times the predetermined rated current. Alternatively, it is determined if the voltage of the shunt wire (R1) 8 is greater than a predetermined value (e.g., 115% times the predetermined rated current times the known resistance of the shunt wire 8). If this test is not met, then the routine 40 returns at 54. Otherwise, at 48, it is determined if the ambient temperature is greater than 40° C. If not, then at 50, it is determined if the temperature of the shunt wire (R1) 8 as represented by the voltage of the example diode (D1) 18 is greater than the "Trip Value". If so, then the trip signal is output to the SCR 26 (FIG. 1) at 52, before the routine 40 returns at 54. Otherwise, the routine 40 returns at 54.

If ambient temperature compensation is optionally employed, and if the ambient temperature is greater than 40° C. at 48, then a suitable incremental trip offset is added to the "Trip Value" from, for example, a look-up table 58 in NV 24 (FIG. 1). The look-up table 58 maintains a suitable mapping of ambient temperature versus incremental trip offset. After either 48 or 56, step 50 is executed as was discussed above.

In the routine 40, the "Trip Value" is preferably determined experimentally for a reference circuit (not shown) using a suitable temperature reference element (not shown) (e.g., without limitation, a reference diode; diode (D1) 18 of FIG. 1; a transistor; a semiconductor device; another suitable temperature reading sensor or element). Then, that experimental "Trip Value" is preferably adjusted at the time of manufacture of a particular circuit interrupter by measuring, for example and without limitation, the forward voltage of the diode (D1) 18 at 25° C. This assumes that: (1) the diode forward voltage at 25° C. may vary from diode to diode; and (2) the diode forward voltage temperature coefficient will be uniform from diode to diode. Also, the temperature of the shunt wire 8 at the trip point is a fixed number.

The temperature of the shunt wire 8 at the trip point is a fixed number and is determined from Equations 1 and 2, as follows:

$$V_X = [V_{X(135\%)} - V_{X(25)}] \quad \text{(Eq. 1)}$$

wherein:

$V_X$ is a "delta trip temperature" voltage value of the temperature reference element, and is assumed to be a fixed value from circuit interrupter to circuit interrupter;

$V_{X(135\%)}$ is the trip voltage value of the temperature reference element at 135% rated current and at 25° C. ambient for the temperature reference element; and $V_{X(25)}$ is, for example and without limitation, the diode forward voltage at 25° C. ambient for the example reference diode (D1) 18.

$$V_Y = [V_{Y(25)} + V_X] \quad \text{(Eq. 2)}$$

wherein:

$V_{Y(25)}$ is, for example and without limitation, the diode forward voltage, which may vary from circuit interrupter to circuit interrupter, at 25° C. ambient for a particular diode such as diode (D1) 18; and $V_Y$ is, for example and without limitation, the unadjusted trip voltage value (unadjusted "Trip Value") for a particular diode such as diode (D1) 18.

In accordance with the disclosed concept, the unadjusted "Trip Value"=$V_Y$ is adjusted as a function of averaged current, I (% rated). If, for example and without limitation, the unadjusted "Trip Value" with insulation at the sense diode is 112 mV, then the unadjusted "Trip Value" with no insulation at the sense diode is 150 mV. If the unadjusted "Trip Value" is set to be 135 mV, then the 135% trip time is 14 minutes (acceptable under UL 489) and the 200% trip time is 240 seconds (too slow under UL 489).

The disclosed concept employs an Adjusted Trip Value as shown in Equation 3:

$$\text{Adjusted Trip Value} = f(k, I(\% \text{ rated})) \quad \text{(Eq. 3)}$$

Non-limiting examples of Equation 3 will be explained in connection with Examples 4 and 5, below.

EXAMPLE 1

Figure 3:
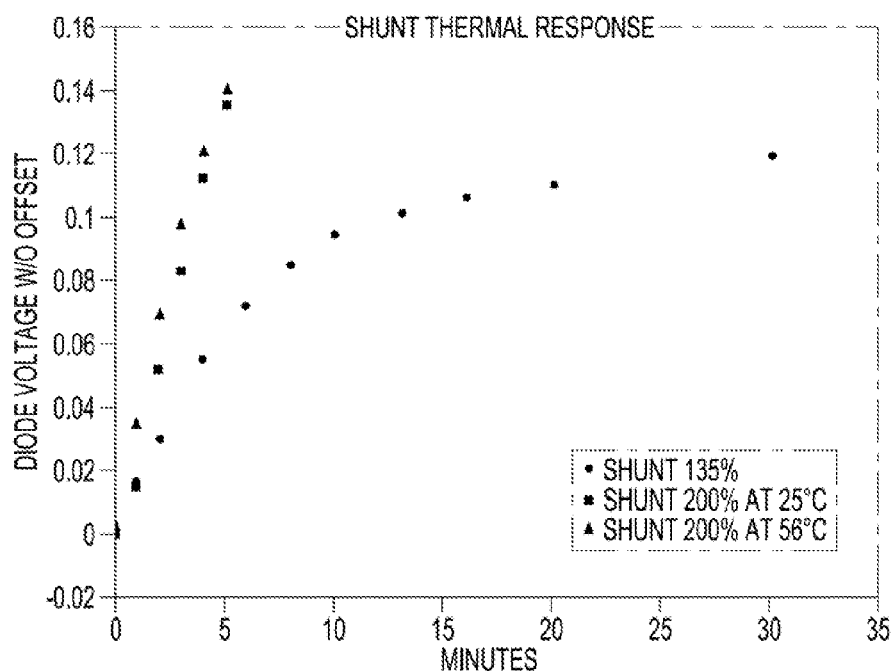
FIG. 3 is a plot of shunt diode voltage versus time for thermal responses at various levels of shunt current and ambient temperature.

The temperature detection circuit includes two diodes for sensing both shunt temperature and ambient temperature, in order to provide ambient temperature compensation. In this example, cold trip time is about 3 to 4 minutes at 200% of rated current at both 25° C. and 56° C. ambient temperatures. The example trip level is about 112 mV, above the zero current level, as measured by the shunt diode. If an insulated shunt wire is employed through a current transformer (CT) for sensing load current, then the shunt wire insulation increases the thermal time constant and makes the response too slow to meet UL 489 (see Table 1, above). FIG. 3 shows the shunt thermal response at 135% rated current, at 200% rated current at 25° C. ambient temperature, and at 200% rated current at 56° C. ambient temperature.

EXAMPLE 2

Figure 4:
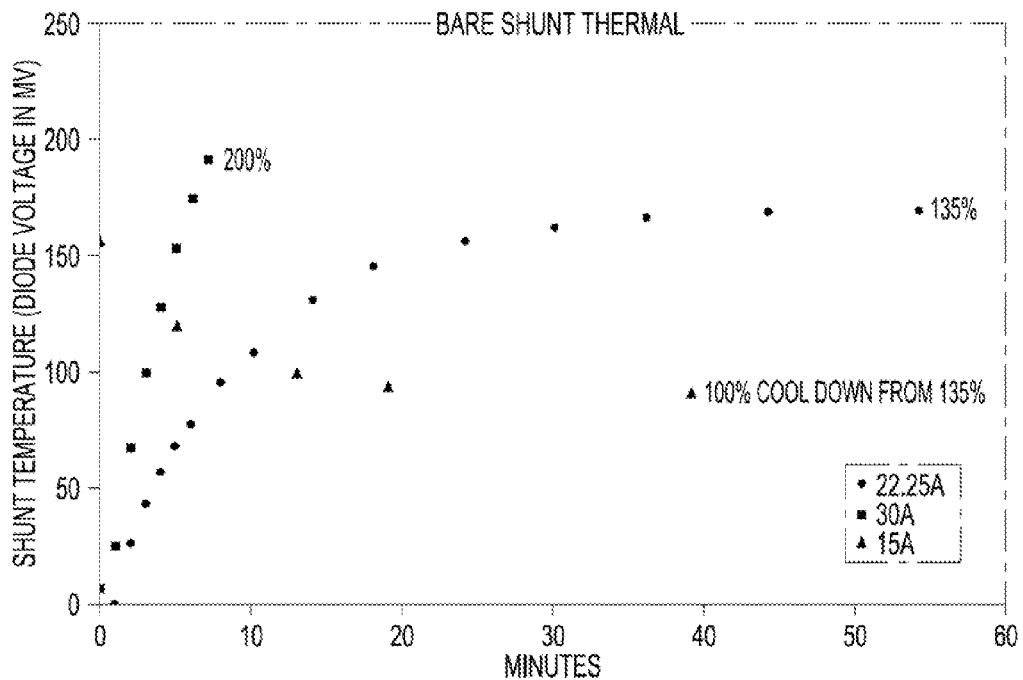
FIG. 4 is a plot of shunt temperature versus time for thermal responses at various levels of shunt current.
Figure 5:
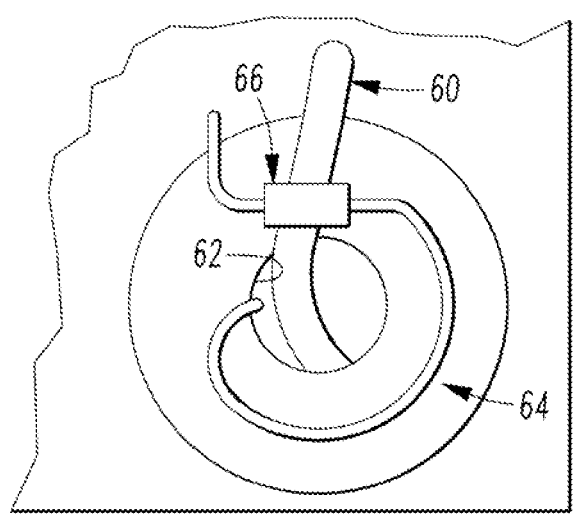
FIG. 5 is a simplified plan view of a current transformer, shunt wire, and shunt diode in accordance with an embodiment of the disclosed concept.

Further to Example 1, insulation on the shunt wire is removed. As shown in FIG. 5, a shunt wire 60 is positioned through an opening 62 of a current transformer (CT) 64, which is employed for current sensing. Thermal contact between the shunt wire 60 and a shunt diode 66 is maintained by employing a suitable mechanical bond (not shown) between the CT 64 and the shunt wire 60 opposite the position of the shunt diode 66. In this example, the 200% trip time is about 4 minutes. FIG. 4 shows the shunt thermal response at 100% rated current (e.g., 15 A), at 135% rated current (e.g., 20.25 A), and at 200% rated current (e.g., 30 A).

EXAMPLE 3

Further to Example 2, if a fixed trip level of 150 mV is selected, then the 200% trip time is still about 4 to 5 minutes. In this example, the thermal time constant increases due to degradation of the insulation of the CT and/or the shunt wire insulation. Insulation degradation can create constant increases before it becomes visual (Example 2) from prior testing. The desired UL 489 200% trip time is between 12 to 120 seconds (2 minutes) from Table 1, above. This desired performance can be achieved by either: (1) decreasing the thermal time constant (reducing the thermal mass surrounding the CT and reducing the thermal resistance from the CT to the bare shunt wire); or (2) employing a suitable function, such as a software algorithm (e.g., a thermal overload predictive function) to create a desired trip-time response in accordance with the teachings of the disclosed concept.

Examples 4 and 5, below, describe software algorithms where the "Trip Value" is made to be a function of the average measured current. Doing this can enable, for example, a +/−50% variation of the trip time with the same physical time constants.

EXAMPLE 4

The Adjusted Trip Value (mV)=k−I (% rated)
wherein:
Adjusted Trip Value is in units of mV;
k=270; and
I (% rated)<=200% for currents above 200% and is, for example, a 10-second average of measured current to eliminate nuisance tripping due to motor starting transients.

The 200% trip time is about 110 seconds at 200%. The trip time at different current levels will average 110 seconds expected for a 200% (e.g., from Table 2, (170+155+135+70+70+70)/6=670/6=111.67=~110 seconds). This is in compliance with trip times required by the UL 489 standard and also eliminates the chances of having a nuisance trip due to transients or inrush currents. This example does not appreciably change the 135% trip time. This adjustment has an acceptable 200% trip time of 110 seconds, which is in the range of 12 seconds to 120 seconds of UL 489.

TABLE 2

| 270 I (% rated) | Trip level = (270 − I (%)) (clamp at 200%) |
|---|---|
| 100 | 170 |
| 115 | 155 |
| 135 | 135 |
| 200 | 70 |
| 300 | 70 |
| 400 | 70 |

EXAMPLE 5

The Adjusted Trip Value (mV)=k+I (% rated)/2
wherein:
Adjusted Trip Value is in units of mV;
k=70; and
I (% rated)<=200% for currents above 200% and is, for example, a 10-second average of measured current to eliminate nuisance tripping due to motor starting transients.

Table 3 and FIG. 4 show the 200% trip time is about 6 minutes or 360 seconds at 200%. This example does not appreciably change the 135% trip time. Also, this adjustment has a 200% trip time of 360 seconds, which is too slow under UL 489.

TABLE 3

| 70 I (% rated) | Trip level = (70 + I (%)/2) (clamp at 200%) |
|---|---|
| 100 | 120 |
| 115 | 127.5 |
| 135 | 137.5 |
| 180 | 160 |
| 190 | 165 |

TABLE 3-continued

| 70 I (% rated) | Trip level = (70 + I (%)/2) (clamp at 200%) |
|---|---|
| 200 | 170 |
| 300 | 170 |
| 400 | 170 |

The above examples demonstrate the performance flexibility opportunities available when the electronic thermal overload approach is used with algorithms to modify the physical trip time performance, at 200% of rated current, by +/−50%. This allows the performance of a fixed physical design to be adapted in software to meet UL 489. Suitable algorithms as are disclosed herein can compensate for any thermal misbehavior (e.g., any example limitations as shown in FIG. 4).

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A method of providing electronic overload protection having a thermal trip level, said method comprising:
    executing a function by a processor;
    providing said electronic overload protection by said function executed by said processor;
    adjusting the thermal trip level by said function executed by said processor in order to mimic adjusting a physical thermal characteristic of a thermal time constant of a fixed mechanical system;
    employing a current transformer as said fixed mechanical system;
    employing at least one of: thermal mass surrounding the current transformer, and thermal resistance from the current transformer to a shunt conductor as said physical thermal characteristic;
    sensing the temperature of a shunt conductor having a predetermined fixed impedance and a thermal mass;
    tripping a circuit interrupter at a variable temperature employing a trip time delay determined by the thermal mass of said shunt conductor; and
    adjusting the variable temperature as a function of current flowing through said shunt conductor having the predetermined fixed impedance,
    wherein said function of current flowing through said shunt conductor includes subtracting measured current flowing through said shunt conductor, as a percentage of rated current of said circuit interrupter, from a predetermined constant.

2. The method of claim 1, wherein said function of current flowing through said shunt conductor includes an average of measured current flowing through said shunt conductor.

3. The method of claim 2, wherein said average is a 10-second average of the measured current.

4. The method of claim 1 further comprising:
    limiting said measured current to be less than or equal to 200% of rated current of said circuit interrupter.

5. The method of claim 1 further comprising:
    employing as said measured current a 10-second average of sensed current flowing through said shunt conductor.

6. The method of claim 1 further comprising:
    modifying trip time performance at 200% of rated current of said circuit interrupter by +/−50% by said function executed by said processor.

7. A circuit interrupter comprising:
    separable contacts structured to be electrically connected in series with a power circuit conductor having a conductor gauge;
    an operating mechanism structured to open and close said separable contacts;
    a processor comprising a thermal overload predictive function;
    a shunt conductor in series with said separable contacts and being structured to measure current flowing through said separable contacts for said thermal overload predictive function, said shunt conductor having about the same conductor gauge as the conductor gauge of said power circuit conductor; and
    a temperature sensor structured to measure the temperature of said shunt conductor,
    wherein said thermal overload predictive function receives said measured current and said measured temperature of said shunt conductor,
    wherein said processor responsive to said thermal overload predictive function is structured to cause said operating mechanism to trip open said separable contacts in response to said measured current and said measured temperature of said shunt conductor when said thermal overload predictive function determines that said measured current is greater than a first predetermined value, and said measured temperature of said shunt conductor is greater than a second value,
    wherein said thermal overload predictive function is further structured to adjust said second value in order to mimic adjusting a physical thermal characteristic of a thermal time constant of a fixed mechanical system,
    wherein said fixed mechanical system is a current transformer,
    wherein said physical thermal characteristic is at least one of: thermal mass surrounding the current transformer, and thermal resistance from the current transformer to said shunt conductor,
    wherein said thermal overload predictive function is structured to sense the temperature of said shunt conductor having a predetermined fixed impedance and a thermal mass, to trip at a variable temperature with a trip time delay determined by the thermal mass of said shunt conductor; and to adjust the variable temperature as a function of current flowing through said shunt conductor, and
    wherein said function of current flowing through said shunt conductor includes subtracting said measured current, as a percentage of rated current of said circuit interrupter, from a predetermined constant.

8. The circuit interrupter of claim 7 wherein said circuit interrupter has a rated current; and wherein said shunt conductor cooperates with said thermal overload predictive function to cause said separable contacts to be tripped open when said measured current is 200% of said rated current for a first time of between 12 and 120 seconds, or when said measured current is 135% of said rated current for a second time of less than 60 minutes.

9. The circuit interrupter of claim 8 wherein said shunt conductor further cooperates with said thermal overload predictive function to not cause said separable contacts to be tripped open when said measured current is 200% of said rated current for a third time of less than 12 seconds, or when said measured current is less than or equal to 115% of said rated current.

10. The circuit interrupter of claim 7 wherein said function of current flowing through said shunt conductor includes an average of said measured current.

11. The circuit interrupter of claim 10 wherein said average is calculated over a previous predetermined length of time.

12. The circuit interrupter of claim 7 wherein said thermal overload predictive function is structured to limit said measured current to be less than or equal to 200% of rated current of said circuit interrupter.

13. The circuit interrupter of claim 7 wherein said measured current is an average of sensed current flowing through said shunt conductor calculated over a previous predetermined length of time.

14. The circuit interrupter of claim 7 wherein said processor further comprises a non-linear ambient temperature compensation function applied to said thermal overload predictive function.

* * * * *